No. 841,649. PATENTED JAN. 15, 1907.
R. W. HOWE & E. J. ORNOLD.
WATER MOTOR.
APPLICATION FILED MAY 7, 1906.

2 SHEETS—SHEET 1.

WITNESSES
Robt F. Dilworth
W. F. Gibson

INVENTORS
Ralph W. Howe
Edwin J. Ornold
By H. E. Douglas
ATTORNEY

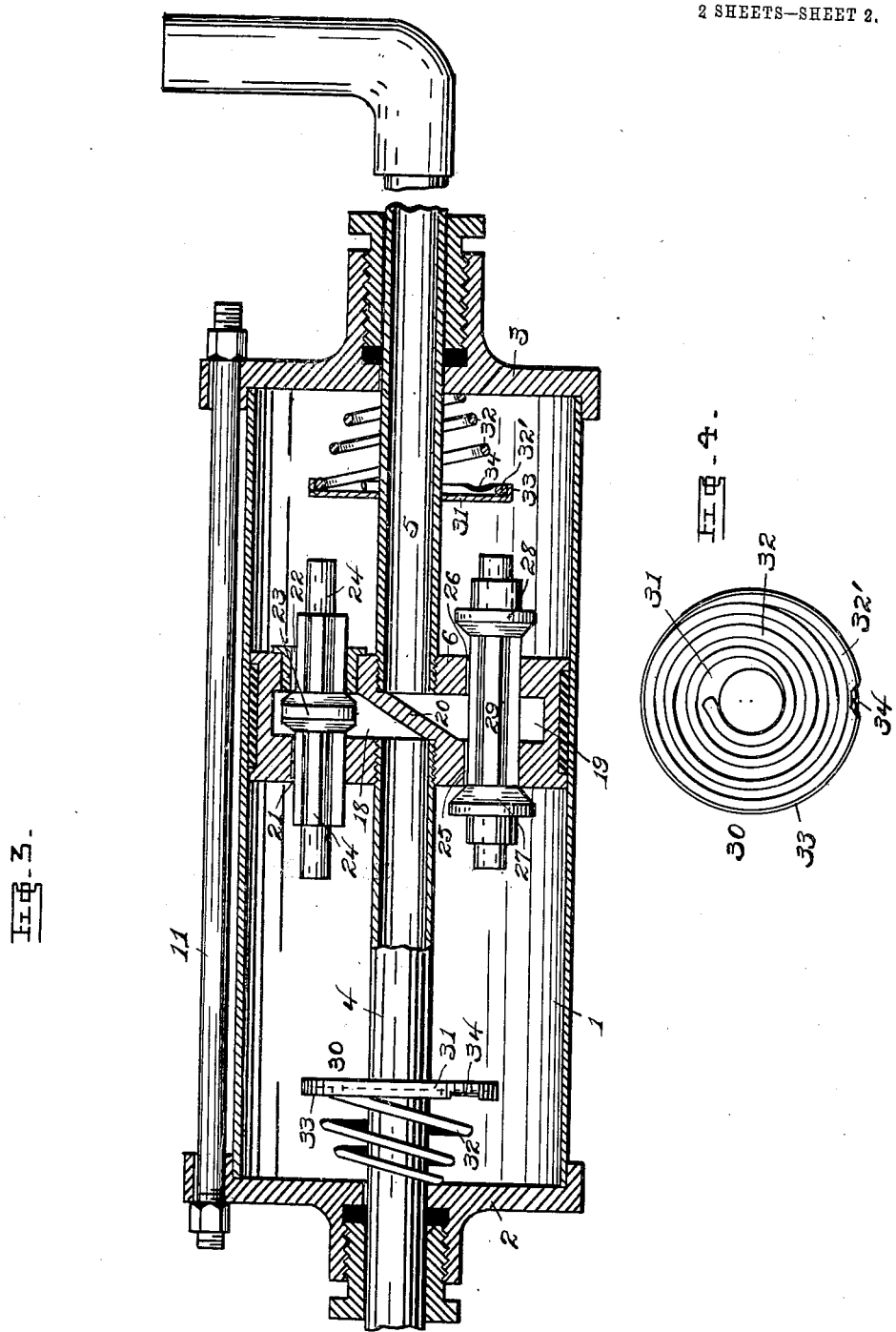

UNITED STATES PATENT OFFICE.

RALPH W. HOWE AND EDWIN J. ORNOLD, OF WHEELING, WEST VIRGINIA.

WATER-MOTOR.

No. 841,649.    Specification of Letters Patent.    Patented Jan. 15, 1907.

Application filed May 7, 1906. Serial No. 315,678.

*To all whom it may concern:*

Be it known that we, RALPH W. HOWE and EDWIN J. ORNOLD, citizens of the United States of America, and residents of Wheeling, county of Ohio, and State of West Virginia, have invented certain new and useful Improvements in Water-Motors, of which the following is a specification.

Our invention relates to new and useful improvements in water-motors, and more especially to a water-motor adapted for furnishing motive power for operating washing-machines, churns, and like light machinery.

The object of the invention is to provide a light, simple, strong, durable, and comparatively inexpensive water-motor in which a reciprocatory motion is imparted to the cylinder, said cylinder traveling upon its water-supply and exhaust pipes, allowing the flexible hose through which it receives its water-supply and the hose through which the water is discharged or exhausted to remain stationary, and thus avoiding the wear of said hose, which is consequent when a reciprocating piston operates in a stationary cylinder.

A further object of the invention is to provide a water-motor the construction of which is such that it may be centrally mounted upon a washing-machine, thus subjecting the machine to less strain and being more rigid than when mounted near the edge of the machine, as with the ordinary reciprocating piston type of motor; and a still further object of the invention is to provide a buffer whereby the valves carried by the piston are after being unseated by the contact of their stems therewith actuated to jump from balanced positions to the opposite valve-seats.

With these and other objects in view the invention finally consists in the particular construction, arrangement, and combination of parts which will hereinafter be fully described, reference being herein had to the accompanying drawings, forming a part of this specification, in which—

Figure 1:
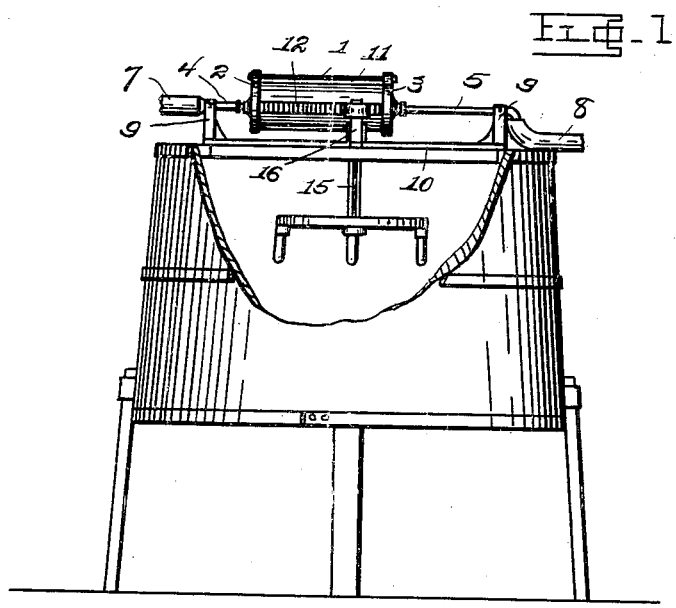
Figure 2:
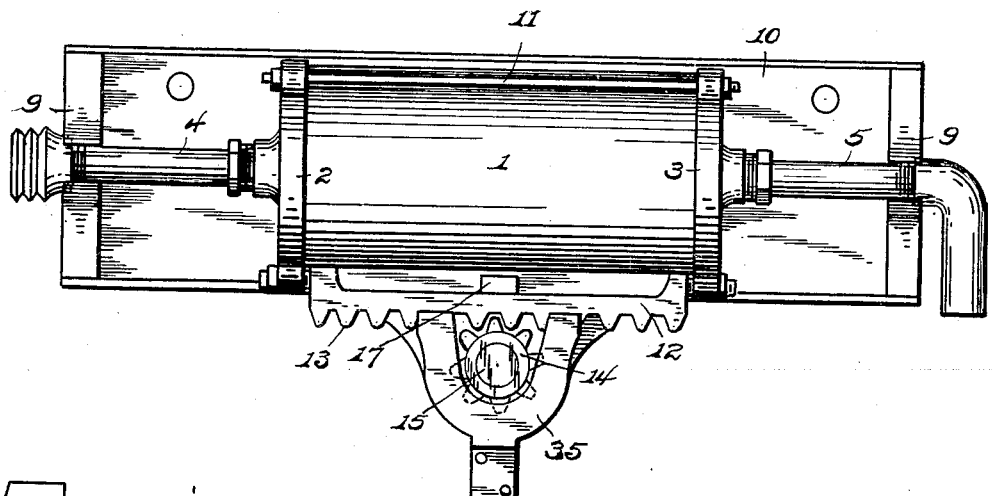

Figure 1 is a side elevation of the invention, showing it applied to a washing-machine. Fig. 2 is a top plan view of the invention. Fig. 3 is a longitudinal sectional view of the cylinder and piston, and Fig. 4 is a rear elevation of a buffer.

Referring to said drawings, in which like reference-numerals designate like parts throughout the several views, 1 indicates a longitudinally-movable or reciprocating cylinder, having its front and rear inclosing heads 2 and 3, respectively, mounted and slidable upon oppositely-disposed stationary pipes 4 and 5, which have their inner ends screwed into the opposite faces of a piston 6. The pipes 4 and 5 are respectively water-supply and water-exhaust pipes, the former being adapted for connection at its outer end to a pipe, hose, or other suitable source of water-supply, a hose 7 being shown in the drawings, while the water-exhaust pipe is adapted for connection to a waste-pipe or to a hose 8, leading to a suitable point for discharging the exhaust-water, as to a sink.

The outer ends of the pipes 4 and 5 are suitably mounted in integral upright lugs 9, carried by a horizontal flat base 10, which is adapted for being centrally mounted upon the top of a washing-machine, as shown.

The cylinder-heads 2 and 3 are secured in place and are held by tie-rods 11. A toothed rack 12 has its opposite ends mounted in said cylinder-heads and lies parallel to said cylinder at one side thereof, the teeth 13 thereof being in engagement with and adapted for communicating a rotary motion to a pinion 14, which is rigidly mounted upon the end of the dasher-shaft 15 of the washing-machine, said shaft being journaled in a vertical sleeve 16, which is formed integral with the base 10. An upright stationary post 17, also integral with said base 10, stands in bracing engagement with the rear or inner face of the toothed rack 12, said post serving to prevent the rack from being sprung back out of engagement with the pinion.

The piston 6 has therein two non-communicating chambers 18 and 19, separated by a partition-wall 20, the former being an inlet-chamber and the latter an exhaust-chamber. The water-supply pipe 4 communicates directly with the chamber 18, while the exhaust-pipe 5 communicates with the chamber 19. Ports or apertures 21 and 22 enter the inlet-chamber 18 from opposite sides of the piston, as shown, and mounted within said chamber is a check-valve 23, having oppositely-disposed stems 24, which project outward through said ports 21 and 22 and beyond the faces of the piston. Said valve 23 is adapted for seating against the inner end of one or the other of said ports 21 and 22, according to the direction taken by the cylinder, and to close said port, as will presently be explained.

Ports or apertures 25 and 26 enter the exhaust-chamber 19 from opposite sides of the piston, said ports being, respectively, controlled by check-valves 27 and 28, provided upon a stem 29 at opposite sides of the piston, the valve 27 being adapted for seating against the outer end of the port 25, closing said port, while the valve 28 stands removed from the port 26, leaving it open, and vice versa.

Loosely mounted on each of the pipes 4 and 5 within the cylinder is a yieldable buffer 30, consisting of a circular sheet-metal disk 31 and a cone-spring 32, the former having a rearwardly-directed annular flange 33, which at a point 34 in its periphery is struck over the base member 32' of the spring 32 to rigidly secure said spring to the disk.

Assuming that all the parts of the motor occupy the positions indicated in Fig. 3, water admitted under pressure through the pipe 4 enters the inlet-chamber 18 and the valve 23 being seated, closing the port 22, passes through the then open port 21 to the front end of the cylinder 1. Actuated by the pressure of water admitted into said front end, the cylinder travels forward, moving upon the pipes 4 and 5, and in so moving carries forward therewith the rear buffer 30, which is freely slidable upon the pipe 5, and as the cylinder moves forward the water in the rear end thereof exhausts through the then open port 26 to the exhaust-chamber 19 and thence outward through the exhaust-pipe 5. The buffer 30 is carried forward against the valve-stems 24 and 29, the face of the disk 31 contacting with said stems and the spring 32 being compressed between said disk and the cylinder-head 3. The valves 23 and 27 are simultaneously unseated by the forcible contact, opening the ports 22 and 25. Said ports being opened and the pressure on opposite sides of the valves being equal said valves are balanced. However, the spring 32 having been compressed before the valves were unseated kicks the balanced valves across to their opposite seats, closing ports 21 and 26. The water is thus admitted to the rear end of the cylinder, causing a reversal of its movement, and the water in the front end of the cylinder is permitted to exhaust through the port 25, exhaust-chamber 19, and exhaust-pipe 5.

As is obvious, the above-described operation is reversed at the end of each stroke of the reciprocating cylinder.

The rack 12, which is rigidly carried by the cylinder, is carried back and forth therewith, imparting a rotary motion to the dasher-shaft 15 through the pinion 14. A suitable shield 35 is preferably employed about the pinion 14 for preventing accidental contact therewith.

Having thus described our invention, what we claim as new, and desire to secure by Letters Patent, is—

1. In a water-motor, a cylinder, a stationary piston therein, piston-rods, valves in said piston for controlling the passage of fluid therethrough, and a yieldable buffer within the cylinder at each end thereof independent of the valves, whereby said valves are actuated to seat after being unseated, said buffer comprising a disk with a spring attached to the rear face thereof.

2. In a water-motor, the combination of a cylinder, a stationary piston therein, hollow piston-rods communicating with said piston, valves for controlling the passage of fluid through the piston, the operating fluid passing through one of said valves and the exhaust fluid through the other valve, and a yieldable buffer within each end of said cylinder, each buffer comprising a floating disk carrying a spring, substantially as described.

3. In a water-motor, a cylinder, a stationary piston therein, stationary pipes connected with the opposite sides of said piston through which the fluid passes for reciprocating said cylinder with relation to the piston, fluid-inlet and fluid-exhaust valves carried by said piston for controlling and directing the flow of the fluid, and a yieldable buffer floating on each of said pipes within the cylinder whereby the valves are actuated to jump from balanced positions to their opposite seats when unseated from contact therewith, said buffers each comprising a flanged sheet-metal disk and a cone-spring secured to said disk.

4. In a water-motor, a cylinder, a stationary piston therein, stationary pipes connected to the opposite sides of said piston through which the fluid passes for reciprocating said cylinder with relation to the piston, fluid-inlet and fluid-exhaust valves carried by said piston for controlling and directing the flow of the fluid, and a yieldable buffer floating on each of said pipes within the cylinder whereby the valves are actuated to jump from balanced positions to their opposite seats when unseated from contact therewith, said buffers each consisting of a circular sheet-metal disk adapted for contacting with the ends of the valve-stems, and a cone-spring encircling the pipe and fixedly attached to the rear side of said disk, substantially as described.

5. In a water-motor, the combination with a piston having fluid-controlling valves therein with outwardly-projecting stems, of yieldable buffers for contacting with said valve-stems and for imparting to said stems a final movement whereby said valves are thrown upon their opposite seats after having been unseated by contact therewith, said buffers each consisting of a sheet-metal disk carrying on its rear face a collapsible spring, substantially as described.

6. In a water-motor, the combination with a piston having fluid-controlling valves therein with outwardly-projecting stems, of yieldable buffers for contacting with said valve-stems and for imparting to said stems a final movement whereby said valves are thrown upon their opposite seats after having been unseated by forcible contact therewith, said buffers each consisting of a sheet-metal disk having a rearwardly-directed annular flange, and a cone-spring rigidly attached to the rear face of said disk by clenching a portion of the flange of the disk over the base member of the spring, substantially as described.

In testimony whereof we affix our signatures in presence of two witnesses.

RALPH W. HOWE.
EDWIN J. ORNOLD.

Witnesses:
H. E. DUNLAP,
ROBT. F. DILWORTH.